(12) United States Patent
Leinonen et al.

(10) Patent No.: US 7,113,752 B2
(45) Date of Patent: Sep. 26, 2006

(54) METHOD FOR SECURING THE OPERATION OF A RECEIVER, AND A RADIO APPARATUS

(75) Inventors: Marko Leinonen, Oulu (FI); Tomi Kangasvieri, Oulu (FI)

(73) Assignee: Nokia Corporation, Espoo (FI)

( * ) Notice: Subject to any disclaimer, the term of this patent is extended or adjusted under 35 U.S.C. 154(b) by 592 days.

(21) Appl. No.: 10/325,054

(22) Filed: Dec. 20, 2002

(65) Prior Publication Data

US 2003/0157907 A1 Aug. 21, 2003

(30) Foreign Application Priority Data

Dec. 31, 2001 (FI) .................................. 20012598

(51) Int. Cl.
*H04B 1/44* (2006.01)
(52) U.S. Cl. ...................................... 455/78; 455/277.1
(58) Field of Classification Search ................. 455/78, 455/83, 277.1, 127, 575, 70, 73, 553, 101, 455/121, 193.1, 577.7, 532.1, 562.1
See application file for complete search history.

(56) References Cited

U.S. PATENT DOCUMENTS

| | | | | |
|---|---|---|---|---|
| 5,557,337 A | * | 9/1996 | Scarpa | 348/558 |
| 5,913,153 A | * | 6/1999 | Nakamoto et al. | 455/78 |
| 6,671,496 B1 | * | 12/2003 | Hoshi | 455/78 |

FOREIGN PATENT DOCUMENTS

EP 0751631 A1 1/1997

OTHER PUBLICATIONS

Patent Abstracts of Japan, JP 09116458, Oct. 16, 1995.

* cited by examiner

*Primary Examiner*—Temica Beamer
*Assistant Examiner*—Joy K. Contee
(74) *Attorney, Agent, or Firm*—Harrington & Smith, LLP

(57) ABSTRACT

A method for securing the operation of a receiver in a two-way radio apparatus by enhancing the isolation between the transmitter and receiver, and a radio apparatus employing said method. The transmitter and receiver in a radio apparatus have separate antennas (320, 330). The transmitter has at least two mutually alternative filters which have different attenuations in the receive band. Transmitting antenna matching is monitored by measuring the strength of the field (re) reflected from the antenna (320) towards the power amplifier (PA). When the strength of the reflected field in proportion to the strength of the propagating field is above a certain threshold, the filter (312) which has a greater stop-band attenuation in the receive band will be used as the transmitting filter. Otherwise, the filter (311) which has a smaller stop-band attenuation and, hence, smaller pass-band attenuation will be used as the transmitting filter. The filters and their selection switches (SW31, SW32) can be integrated into a single component. The receiver noise level can be kept relatively low also when the matching of the transmitting antenna changes for external reasons, without substantially increasing power loss between the RF power amplifier and the antenna.

17 Claims, 3 Drawing Sheets

METHOD FOR SECURING THE OPERATION OF A RECEIVER, AND A RADIO APPARATUS

The invention relates to a method for securing the operation of a receiver in a two-way radio apparatus by enhancing the separation between the transmitter and receiver. The invention also relates to a radio apparatus employing said method.

In two-way radio systems the transmit and receive bands are usually relatively close to one another. Therefore, special care has to be taken to prevent the relatively high-power transmission from interfering with the reception, or the wideband noise linked with the transmitted signal from blocking the receiver. In a full-duplex system, where information is transferred in both directions simultaneously, the transfer directions are traditionally separated using a duplex filter connected to an antenna shared by transmission and reception. A duplex filter includes ports for the antenna of the radio apparatus and also for the transmitter and receiver. Attenuation of a transmit-band signal fed by the transmitter is high towards the receiving port, but small towards the antenna port. Conversely, attenuation of a receive-band signal coming from the antenna is high towards the transmitting port, but small towards the receiving port. This way, signals are directed to the right directions in the duplex filter. A drawback of the duplex filter is that it has relatively high production costs and, especially in portable devices, its need of space and considerable energy consumption caused by losses.

Figure 1:
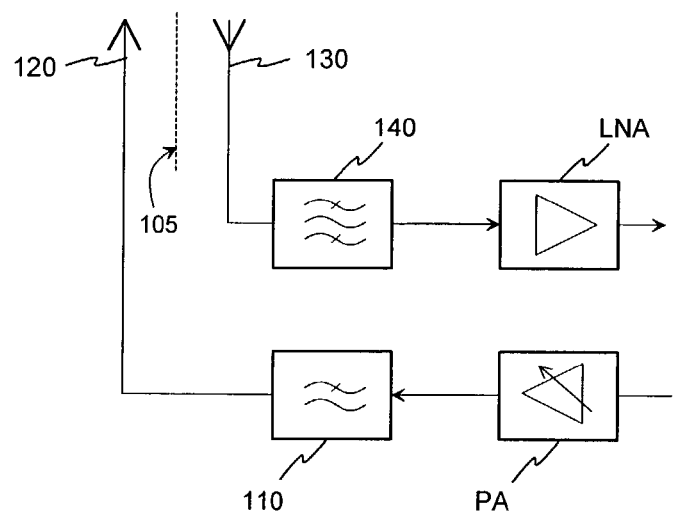

A duplex filter is not needed if a separate antenna is provided for the receiver, and adequate isolation is provided between the transmitting and receiving antennas. FIG. 1 depicts such a known structure. It comprises, connected in series, a RF power amplifier PA, transmitter-end filter 110, and a transmitting antenna 120. In addition there is a separate receiving antenna 130 which is connected to a receiver-end antenna filter 140 which is further connected to a low-noise amplifier LNA. Between the antennas in FIG. 1 there is drawn a broken line 105, meaning an arrangement which electromagnetically isolates the transmitting and receiving antennas. This arrangement can comprise a grounded conductive strip or just a physical distance between the antennas, for example. The latter way is naturally inapplicable in small communications devices. For the most part, the transmitting and receiving filters 110, 140 carry out the isolationg of the whole transmitting branch and receiving branch from each other. Even combined, they are simpler, smaller, and cheaper than a duplex filter with corresponding characteristics. Their order need not be as great as that of the transmission and receiving filters of a corresponding duplex filter, for part of the attenuation of said branches of the duplex filter is provided by antenna isolation in the arrangement of FIG. 1.

The attenuation needed from the transmitting branch to the receiving branch can be calculated for different systems from air interface specifications. System specifications can be used to calculate the maximum allowed noise level caused by the transmitter in the receiver. Such a maximum noise level requirement also exists in devices functioning in accordance with TDMA system (time division multiple access) although the transmitter in them is not necessarily active simultaneously with the receiver.

Figure 2A:
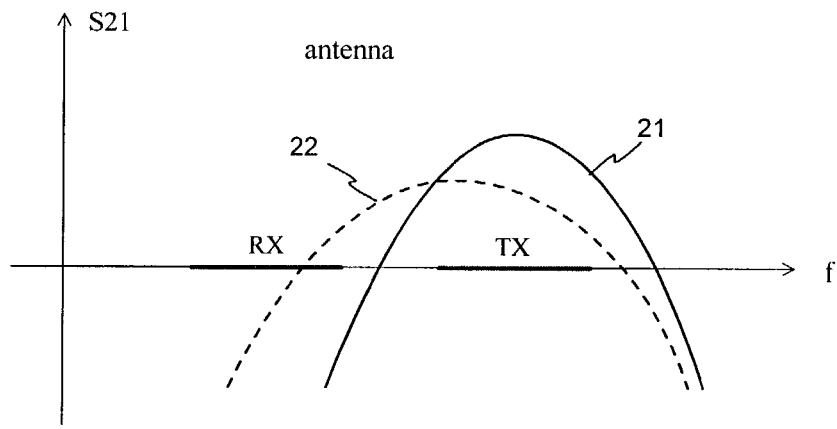
Figure 2B:
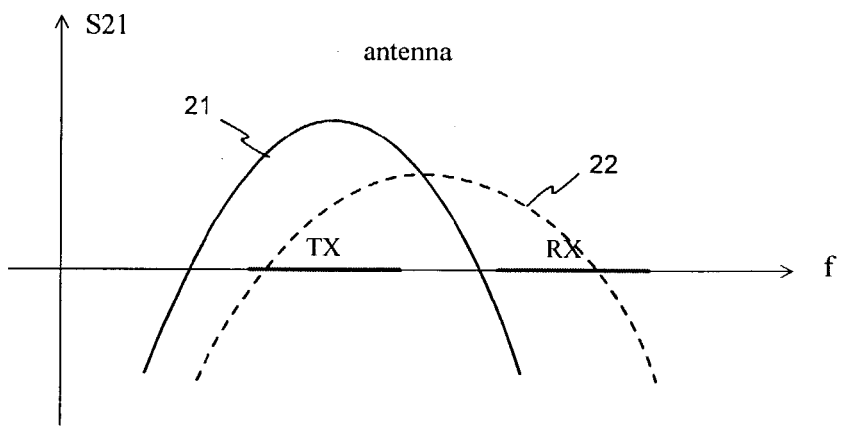

If the arrangement of FIG. 1 produces an attenuation from the transmitting branch to the receiving branch required in an operating situation, then transmitting and receiving work normally. In practice, however, the user's finger or some other external conductive material often results in a change in the matching of internal planar antennas. This can be seen in flattening of the slopes of the antenna's amplitude response curve and shifting of the center frequency, as depicted in FIGS. 2a and 2b. In these Figures, curve 21 represents the amplitude response of an undisturbed transmitting antenna, and curve 22 represents the amplitude response of the same antenna when this is loaded by putting a finger on it, for example. The curves represent the response from the transmitting antenna port to the receiving antenna port, whereby they are determined from the physical dimensions of the antennas and possible tuning circuits associated therewith. In the example of FIG. 2a, the transmit band TX is above the receive band RX, which is the situation in the GSM700 (global system for mobile communications), for example. In FIG. 2b, the transmit band TX is below the receive band RX, which is the situation in systems such as the GSM400, GSM800, GSM900, GSM1800, GSM1900, CDMA-One (code division multiple access), WCDMA (wideband CDMA), and US-TDMA. So, the order shown in FIG. 2b is more common in practice. As a result of the mismatch the isolating attenuation may drop to a few decibels, which means a relatively high noise and interference level in receiving. Moreover, this may result in dropped calls, for example. The drawback can be somewhat alleviated by means of mechanical design of the antennas, e.g. by making the surfaces of the radiating planes knobby. Such measures, however, are inadequate.

It is conceivable that the above-mentioned disadvantage can be avoided by increasing the stop-band attenuation in the transmitter-end filter so that e.g. shifting of the antenna resonance towards the receiving band will not result in a significant increase in the noise level in the receiver. Fabricating a bandpass filter with a sufficient stop-band attenuation is not difficult as such. A new drawback would be, however, that in such a bandpass filter also the pass-band attenuation would inevitably be greater than in the original one. Attenuation after the last RF amplifier is especially harmful as greater losses mean greater current consumption in the power amplifier and potential warming problems.

An object of the invention is to eliminate the disadvantages associated with the prior art. A method according to the invention is characterized in that which is specified in the independent claim 1. A radio apparatus according to the invention is characterized in that which is specified in the independent claim 5. Some advantageous embodiments of the invention are specified in the other claims.

The basic idea of the invention is as follows: A transmitter and receiver have separate antennas. The transmitter has at least two alternative filters which have different receive-band attenuations. Transmitting antenna matching is monitored by measuring the strength of a field reflected from the antenna towards the power amplifier. When the ratio of the strength of the reflected field to the strength of the propagating field is above a certain threshold, the filter having the greater stop-band attenuation in the receive band will be used as the transmitter-end antenna filter, or transmitting filter. Otherwise, the filter having the smaller stop-band attenuation and, hence, smaller pass-band attenuation will be used as the transmitting filter. The filters and their selection switches can be integrated into a single component. A similar arrangement comprising at least two filters may also be used in the receiving branch.

An advantage of the invention is that the receiver noise level can be kept relatively low also in a situation in which the matching of the transmitting antenna changes for external reasons. This will mean a decrease in the number of dropped calls, among other things. The advantage can be achieved without substantially increasing the mean power loss between the power amplifier feeding the antenna and the antenna. The reason for this is that the transmitting filter that produces the greater pass-band attenuation is typically used only for a relatively short period of time. Another advantage of the invention is that the arrangement according to the invention reserves a space which is substantially smaller than that reserved by a duplex filter.

Figure 4:
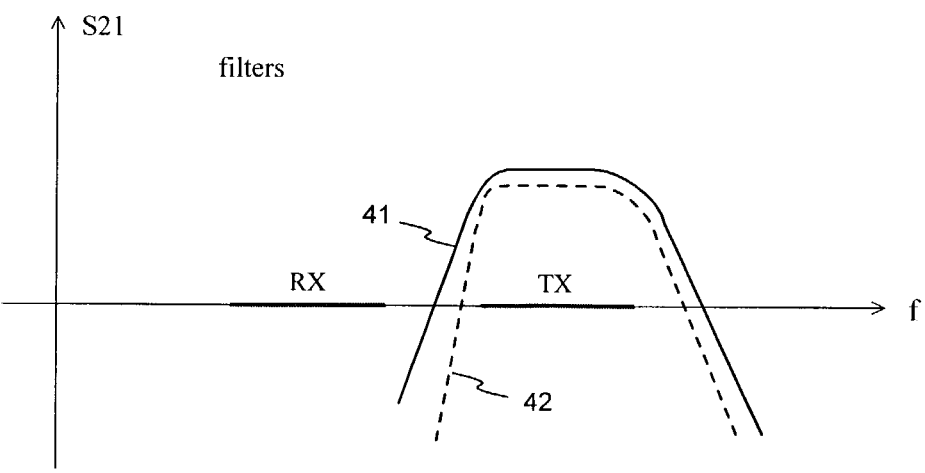
Figure 5:
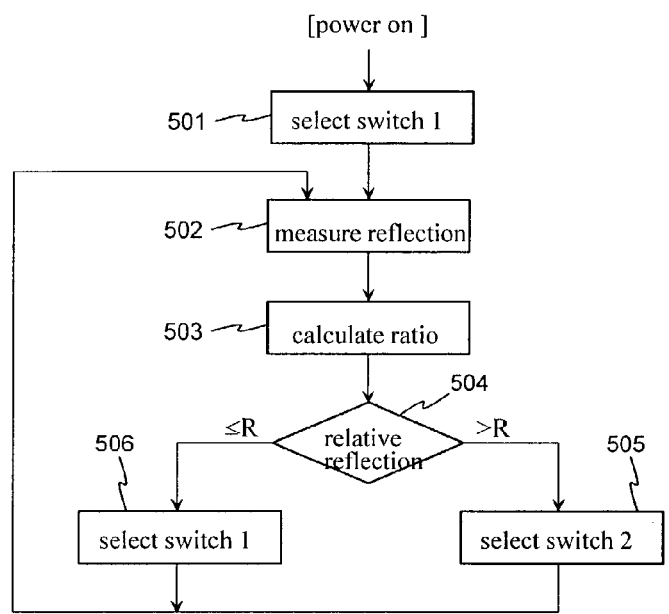
Figure 6:
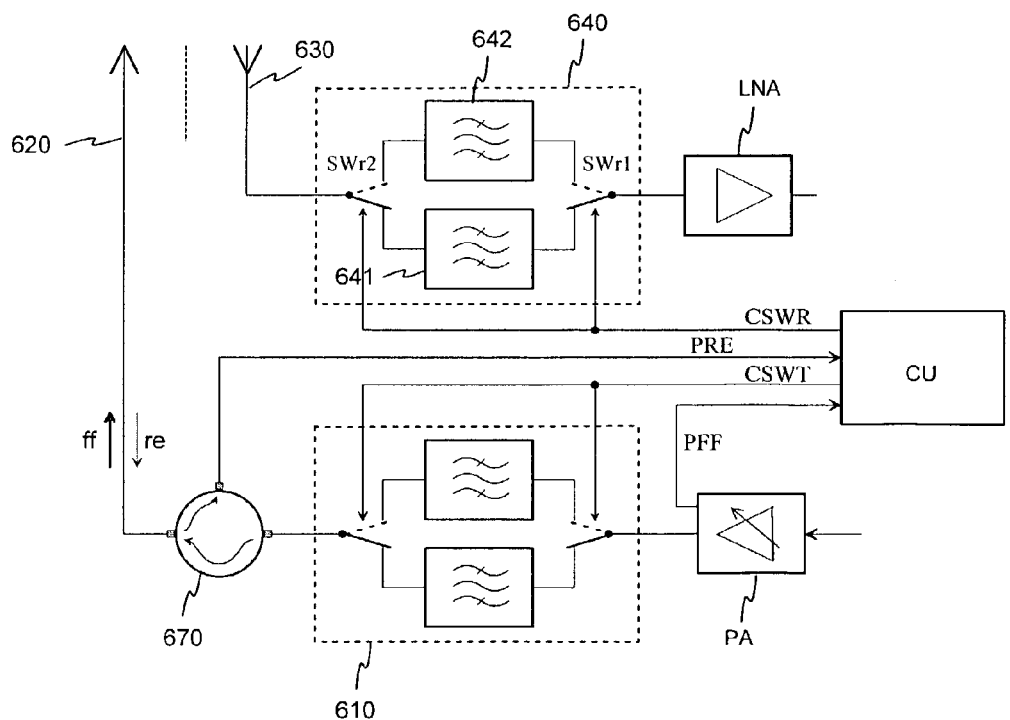

The invention is below described in closer detail. The description refers to the accompanying drawings in which FIG. 1 illustrates how the operation of a receiver is secured according to the prior art, FIGS. 2a,b show an example of degradation of the matching of a transmitting antenna, FIG. 3 shows an example of how the operation of a receiver is secured according to the invention, FIG. 4 shows exemplary amplitude responses of transmitting filters, FIG. 5 shows an example of the method according to the invention, and FIG. 6 shows a second example of how the operation of a receiver is secured according to the invention.

FIGS. 1 and 2a,b were already discussed in conjunction with the description of the prior art.

Figure 3:
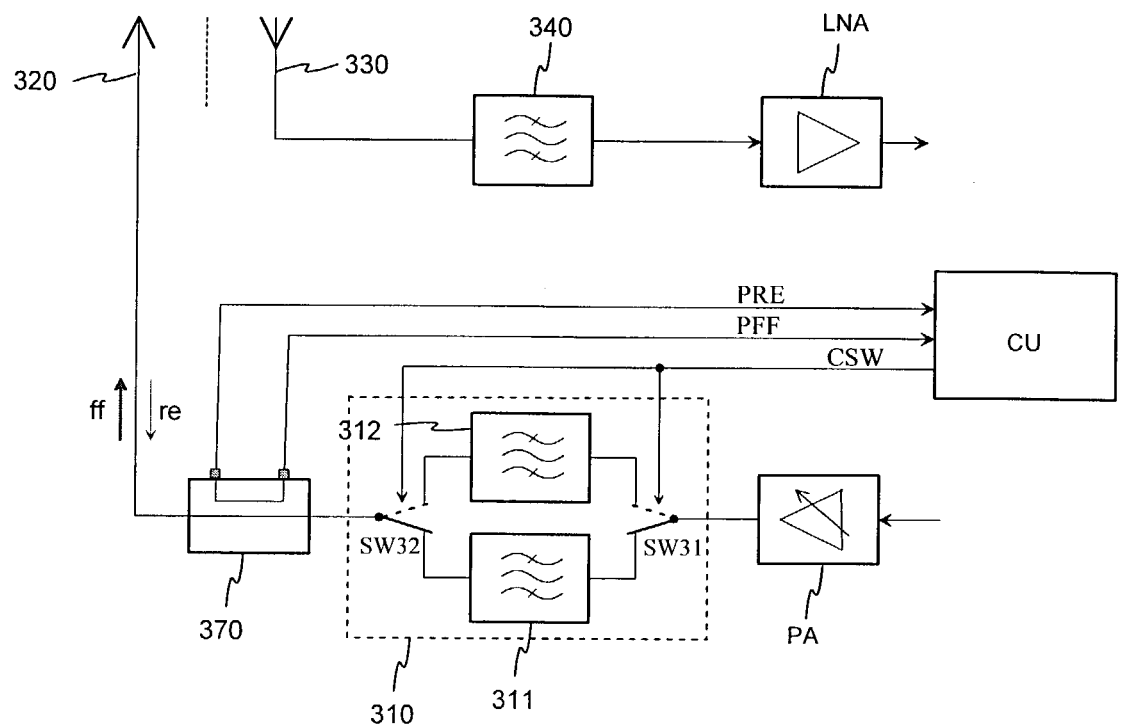

FIG. 3 shows in the form of a block diagram an example of the arrangement according to the invention for securing the operation of a receiver. As in FIG. 1, there are shown a RF power amplifier PA, a first transmitting filter 311 and a transmitting antenna 320 belonging to the transmitter of a radio apparatus, and a receiving antenna 330, receiving filter 340 and a low-noise amplifier LNA belonging to the receiver of the same radio apparatus.

In this description and in the claims, a "transmitting filter" means a filter which is connected between the power amplifier of the transmitter and the transmitting antenna and located nearest to the antenna, with the purpose of attenuating undesired frequency components in the signal to be transmitted onto the radio path. Similarly, a "receiving filter" means a so-called preselection filter connected between the receiving antenna and the low-noise amplifier, with the purpose of attenuating undesired frequency components in the signal received from the radio path.

In FIG. 3 there is, additional to the structure of FIG. 1, a second transmitting filter 312 in parallel with the first transmitting filter, and a directional coupler 370 between the transmitting filters and transmitting antenna. The transmitting filters are alternative to each other, so there is a selection switch SW31 on their input side and a selection switch SW32 on their output side. By means of the switches, one of the transmitting filters can be connected between the power amplifier and the transmitting antenna. The switches may be e.g. PIN diodes or other radio frequency semiconductor switches. MEMS (microelectro-mechanical system) switches may also be used. The directional coupler 370 produces a radio frequency signal PRE the strength of which is proportional to the power of the field re reflected from the transmitting antenna. The directional coupler also produces a signal PFF the strength of which is proportional to the power of the field ff fed to the transmitting antenna. The signals PRE and PFF are taken to a control unit CU which is e.g. a functional element in a main processor of the radio apparatus. The control unit in turn produces a control signal CSW for the switches SW31 and SW32. The first and second transmitting filters and the selection switches SW31 and SW32 together constitute a transmitting-branch filter unit 310. This can be realized as an integrated component. When small size is desired, the filters may be e.g. dielectric resonator filters or surface acoustic wave (SAW) filters. On the other hand, the filters may also be integrated on a printed circuit board.

There may be more than two transmitting filters in a radio apparatus according to the invention, too. The filter unit 310 in FIG. 3 would in that case be replaced by a larger unit in which any one of a plurality of mutually alternative transmitting filters could be selected by means of switches.

FIG. 4 shows exemplary transmitting filter responses. Curve 41 represents the amplitude response of a first transmitting filter, and curve 42 the amplitude response of a second transmitting filter. In the latter, the slope on the receive band RX side is considerably steeper than in the former, which means a higher stop-band attenuation in the receive band. As a consequence, while the filtering response for the part of transmitting antenna in the receive band is degraded by the effect of the user's hand, the level of the interfering signal in the receive band is substantially smaller when using the second transmitting filter than when using the first transmitting filter. Curve 42 is a little lower than curve 41 at the pass band, too, which means that the pass-band attenuation of the second transmitting filter is greater than that of the first transmitting filter. In a way this is the price for a better protection for the receive band.

FIG. 5 shows in the form of a flow diagram an example of the method according to the invention for securing the operation of a receiver. With the power switched on in the radio apparatus, the first transmitting filter 311 is at first connected for use (step 501). In step 502, the level of the field re reflected from the antenna is measured. This is done in the control unit CU by detecting the signal PRE from the directional coupler. Level measurements are naturally carried out only when radio transmitting is on. In step 503 the control unit computes the ratio of the reflected field and the field propagating towards the antenna, using additionally a detection result for the directional coupler signal PFF. Next, in step 504, the computed relative strength of the reflected field is compared to a certain threshold value R. If the relative strength exceeds the threshold value R, the second transmitting filter 312 will be connected as the transmitting filter, step 505. The noise and interference level in the receive band will then drop in accordance with the description of FIG. 4. If the relative strength is smaller than the threshold value R, the first transmitting filter 311 will be connected as the transmitting filter, step 506. If the first transmitting filter was already in use, there is of course no need to change the switch control CSW. After step 505 or 506 the process returns to step 502 and continues to monitor the level of the reflected field.

If the transmitter has several mutually alternative transmitting filters, there may also be more than one predetermined threshold value for the relative strength of the field reflected. In that case, a transmitting filter is selected in step 504 of FIG. 5 in accordance with each value defined for the relative strength of the reflected field.

FIG. 6 shows in the form of a block diagram a second example of the arrangement according to the invention for protecting receiving. The difference to the structure of FIG. 3 is that now the receiving branch, too, has two alternative filters instead of one: The receiving branch filter unit 640 is similar to the filter unit 310 of FIG. 3 with that obvious difference that instead of the transmit band the pass bands of the first receiving filter 641 and second receiving filter 642 cover the receive band of the radio system in question. Correspondingly, the transition band in the amplitude response of the second receiving filter on the transmit band side is narrower than with the first receiving filter. The selection switches SWr1 and SWr2 in the filter unit 640 are controlled by the signal CSWR of the control unit which signal changes states according to a certain criterion on the basis of the field strengths PRE and PFF. The control signal CSWR may also be the same as the control signal CSWT for the transmitting branch filter unit 610. For measuring the reflected field, the example of FIG. 6 includes a circulator 670 instead of a directional coupler. In this case the strength information PFF for the propagating field is obtained direct from the power amplifier PA, by means of a measuring circuit therein.

There may also be more than two receiving filters in a radio apparatus according to the invention. In that case, the filter unit 640 would be replaced by a larger unit where any one of a plurality of mutually alternative receiving filters can be selected by means of switches. For selecting the receiving filter and transmitting filter it is possible to develop an algorithm which in each case makes optimal filter selections based on the result from the comparison concerning the relative strength of the reflected field.

FIGS. 3 and 6 show only selection switches for one conductor of the signal path. If the second conductor is one that is isolated from the signal ground, it requires a second set of identical switches.

Solutions according to the invention were described above. The invention is not limited to those solutions. The inventional idea can be applied in different ways within the scope defined by the independent claims 1 and 5.

The invention claimed is:

1. A method for securing operation of a receiver in a radio apparatus, in which a transmitter operates in a certain transmit band and the receiver operates in a certain receive band, and which radio apparatus has a transmitting antenna and a receiving antenna separate from one another, a first transmitting filter and receiving filter, the radio apparatus further comprising at least a second transmitting filter a stop-band attenuation of which in the receive band is substantially greater than the stop-band attenuation of the first transmitting filter in the receive band, the method comprising steps;
   strength of a field reflected from the transmitting antenna is repeatedly measured,
   a relative strength of the reflected field is compared to a certain threshold value,
   the second transmitting filter is selected to be operating transmitting filter if said relative strength exceeds the threshold value, and
   the first transmitting filter is selected to be operating transmitting filter if said relative strength is below the threshold value.

2. A method for securing operation of a receiver in a radio apparatus, in which a transmitter operates in a certain transmit band and the receiver operates in a certain receive band, and which radio apparatus has a transmitting antenna and a receiving antenna separate from one another, a first transmitting filter and receiving filter, the radio apparatus further comprising at least a second transmitting filter a stop-band attenuation of which in the receive band is substantially greater than the stop-band attenuation of the first transmitting filter in the receive band, the method comprising steps;
   strength of a field reflected from the transmitting antenna is repeatedly measured,
   a relative strength of the reflected field is compared to a certain threshold value,
   the second transmitting filter is selected to be operating transmitting filter if said relative strength exceeds the threshold value, and
   the first transmitting filter is selected to be operating transmitting filter if said relative strength is below the threshold value,
wherein the radio apparatus further comprises at least a second receiving filter the stop-band attenuation of which in the transmit band is substantially greater than the stop-band attenuation of the first receiving filter in the transmit band, the method further comprising steps;
   the first receiving filter is selected to be operating receiving filter always at the same time when the first transmitting filter is selected to be operating transmitting filter,
   the second receiving filter is selected to be operating receiving filter always at the same time when the second transmitting filter is selected to be operating transmitting filter.

3. A method for securing operation of a receiver in a radio apparatus, in which a transmitter operates in a certain transmit band and the receiver operates in a certain receive band, and which radio apparatus has a transmitting antenna and a receiving antenna separate from one another, a first transmitting filter and receiving filter, the radio apparatus further comprising at least a second transmitting filter a stop-band attenuation of which in the receive band is substantially greater than the stop-band attenuation of the first transmitting filter in the receive band, the method comprising steps;
   strength of a field reflected from the transmitting antenna is repeatedly measured,
   a relative strength of the reflected field is compared to a certain threshold value,
   the second transmitting filter is selected to be operating transmitting filter if said relative strength exceeds the threshold value, and
   the first transmitting filter is selected to be operating transmitting filter if said relative strength is below the threshold value,
wherein the radio apparatus comprises at least three transmitting filters with differing stop-band attenuations in the receive band and there are at least two predetermined threshold values for the relative strength of the reflected field, the method comprising steps;
   the relative strength of the reflected field is compared to said predetermined threshold values, and
   one of the transmitting filters is selected to be operating transmitting filter on the basis of result of the comparison concerning the relative strength of the reflected field.

4. A method according to claim 2, one of the transmitting filters being selected to be operating transmitting filter and one of the receiving filters being selected to be operating receiving filter on the basis of result of the comparison concerning the relative strength of the reflected field using a certain algorithm.

5. A radio apparatus with a transmitter, a receiver and a transmitting antenna and receiving antenna separate from one another, the transmitter having a power amplifier and a first transmitting filter and the receiver having a first receiving filter, wherein, to secure the operation of the receiver, the radio apparatus further comprises
   at least a second transmitting filter the stop-band attenuation of which in a receive band is substantially greater than the stop-band attenuation of the first transmitting filter in the receive band, and means for using the first transmitting filter as operating transmitting filter if a relative strength of the field reflected from the transmitting antenna exceeds a predetermined value and the second transmitting filter as operating transmitting filter if the relative strength of the field reflected from the transmitting antenna is below said predetermined value.

6. A radio apparatus with a transmitter, a receiver and a transmitting antenna and receiving antenna separate from one another, the transmitter having a power amplifier and a first transmitting filter and the receiver having a first receiving filter, wherein, to secure the operation of the receiver, the radio apparatus further comprises at least a second transmitting filter the stop-band attenuation of which in a receive band is substantially greater than the stop-band attenuation of the first transmitting filter in the receive band, and means for using the first transmitting filter as operating transmitting filter if a relative strength of the field reflected from the transmitting antenna exceeds a predetermined value and the second transmitting filter as operating transmitting filter if the relative strength of the field reflected from the transmitting antenna is below said predetermined value.

said means for using either the first or the second transmitting filter comprising an element to measure the strength of the reflected field, two-way switches to connect the selected transmitting filter to signal path, and a control unit to set states of the two-way switches on the basis of measurement information on the reflected field.

7. A radio apparatus according to claim 6, said two-way switches comprising a first two-way switch which is connected to an output of said power amplifier and a first change-over contact of which is connected to an input of the first transmitting filter and a second change-over contact of which is connected to an input of the second transmitting filter, and a second two-way switch which is connected to said element to measure the strength of the reflected field and a first change-over contact of which is connected to an output of the first transmitting filter and a second change-over contact of which is connected to an output of the second transmitting filter.

8. A radio apparatus according to claim 6, said two-way switches being realized by radio frequency semiconductors.

9. A radio apparatus according to claim 6, said two-way witches being realized by MEMS switches.

10. A radio apparatus according to claim 6, said filters and two-way switches making up an integrated component.

11. A radio apparatus with a transmitter, a receiver and a transmitting antenna and receiving antenna separate from one another, the transmitter having a power amplifier and a first transmitting filter and the receiver having a first receiving filter, wherein, to secure the operation of the receiver, the radio apparatus further comprises at least a second transmitting filter the stop-band attenuation of which in a receive band is substantially greater than the stop-band attenuation of the first transmitting filter in the receive band, and means for using the first transmitting filter as operating transmitting filter if a relative strength of the field reflected from the transmitting antenna exceeds a predetermined value and the second transmitting filter as operating transmitting filter if the relative strength of the field reflected from the transmitting antenna is below said predetermined value.

to secure the receiving, further comprising at least a second receiving filter the stop-band attenuation of which in a transmit band is substantially greater than the stop-band attenuation of the first receiving filter in the transmit band, and means for using the first receiving filter as operating receiving filter if the relative strength of the field reflected from the transmitting antenna exceeds a predetermined value and the second receiving filter as operating receiving filter if the relative strength of the field reflected from the transmitting antenna is below said predetermined value.

12. A radio apparatus according to claim 5, said filters being SAW filters.

13. A radio apparatus according to claim 5, said filters being dielectric resonator filters.

14. A radio apparatus according to claim 5, said filters being integrated into a printed circuit board.

15. A radio apparatus according to claim 6, said element to measure the strength of the reflected field being a directional coupler.

16. A radio apparatus according to claim 6, said element to measure the strength of the reflected field being a circulator.

17. A radio comprising a transmitter for transmitting in a first band, a receiver for receiving in a second band, and at least a first transmitting filter and a second transmitting filter, wherein a stop-band attenuation of the second transmitting filter in the receive band is substantially greater than the stop-band attenuation of the first transmitting filter in the receive band, and the arrangement further comprises means to use the first transmitting filter as an operating transmitting filter if a relative strength of a field reflected from a transmitting antenna connected to the arrangement exceeds a predetermined threshold value, and to use the second transmitting filter as an operating transmitting filter if the relative strength of the field reflected from said transmitting antenna is below said predetermined threshold value.

* * * * *